(12) United States Patent
Grace et al.

(10) Patent No.: US 7,374,050 B2
(45) Date of Patent: May 20, 2008

(54) HIGH CAPACITY AND HIGH EFFICIENCY FILTER DECK ASSEMBLY

(75) Inventors: Todd S. Grace, Alpharetta, GA (US); Joseph A. Gottberg, Mooresville, NC (US)

(73) Assignee: Andritz Inc., Glens Falls, NY (US)

( * ) Notice: Subject to any disclaimer, the term of this patent is extended or adjusted under 35 U.S.C. 154(b) by 290 days.

(21) Appl. No.: 10/830,148

(22) Filed: Apr. 23, 2004

(65) Prior Publication Data
US 2005/0236339 A1    Oct. 27, 2005

(51) Int. Cl.
*B01D 33/073* (2006.01)
(52) U.S. Cl. .................. 210/404; 210/489; 210/497.01; 210/499
(58) Field of Classification Search ................ 210/359, 210/402, 404, 406, 455, 490, 497.01, 498, 210/499, 488, 489; 162/323
See application file for complete search history.

(56) References Cited

U.S. PATENT DOCUMENTS

| | | | |
|---|---|---|---|
| 3,794,178 A | 2/1974 | Luthi | |
| 3,837,499 A * | 9/1974 | Luthi | ........................ 210/404 |
| 3,954,622 A | 5/1976 | Kus | |
| 4,276,169 A | 6/1981 | Browne et al. | |
| 4,808,265 A | 2/1989 | Luthi et al. | |
| 4,906,364 A | 3/1990 | Luthi et al. | |
| 2005/0236339 A1 * | 10/2005 | Grace et al. | ................ 210/784 |

* cited by examiner

*Primary Examiner*—Matthew O Savage
(74) *Attorney, Agent, or Firm*—Nixon & Vanderhye P.C.

(57) ABSTRACT

A rotary drum filter has a plurality of longitudinally extending division grids mounted about the outer circumference of a drum. A plurality of corrugated sheets are provided, with the leading and trailing edges of each sheet mounted to circumferentially adjacent pairs of division grids to define filtrate compartments. An equivalent number of perforated filter plates are also provided. Each filter plate is attached to the top of a corrugated sheet and has a leading edge and a trailing edge that are set back from the leading edge and trailing edge of the corrugated sheet. A seal clip is positioned near the leading edge of each corrugated sheet. A seal member or seal members is/are held in place by the seal clip and is/are positioned at the face of the leading edge of each corrugated sheet or beneath and near the face or each corrugated sheet. A perforated cap strip can be removably attached to the top of each division grid to thereby retain for confined movement each filter plate and corrugated sheet combination (filter deck and drainage deck) during rotary drum filter operation and to allow easy replacement of the filter plate and corrugated sheet combination(s) and/or cap strip(s) when the rotary drum filter is not in operation. This rotary drum filter design and operation has increased capacity and efficiency.

47 Claims, 16 Drawing Sheets

HIGH CAPACITY AND HIGH EFFICIENCY FILTER DECK ASSEMBLY

FIELD OF TECHNOLOGY

The present invention relates generally to a filter deck assembly and its method of use and replacement. In particular, the present invention relates to a specially designed, constructed, utilized and replaceable high capacity and high efficiency filter deck assembly for a rotary drum filter.

BACKGROUND AND SUMMARY OF TECHNOLOGY

Rotary drum filters are well known and are used in the pulp and paper industry to filter and wash pulp slurries, for example, from U.S. Pat. Nos. 4,808,265 and 4,906,364 (the entire contents of which are expressly incorporated hereinto by reference). Rotary drum filters generally comprise a cylindrical drum mounted for rotation in a tank containing a slurry solution. A filter deck assembly is mounted radially outward of the surface of the drum. As the drum is rotated, a low pressure is maintained inside the drum so that a pulp sheet is formed on the surface of the filter deck assembly. The filter deck assembly functions to space the pulp from the drum surface to facilitate filtering and drainage.

The filter deck assembly usually includes a filter deck on top and a drainage deck below, which directs the filtrate to filtrate compartments. The liquid filtrate is drawn through the filter deck and the drainage deck and into the filtrate compartments by a pressure differential. Filtrate is removed from the filtrate compartments in a conventional manner. The filter deck assembly must prevent rewetting of the pulp sheet as the drum rotates through the descending path of the filtrate cycle.

Metal plates having fine perforations, slots or other apertures are often used as the filter deck. Corrugated sheets attached below the filter decks are used as the drainage decks. The metal plates, the corrugated sheets, and the drum may each be made of different metals.

The filter deck assembly for rotary drum filters must be capable of withstanding differential thermal expansion of the component elements due to the temperature variations in the filtering cycles. For example, temperature differentials of up to 100 degrees Fahrenheit expose the filter deck assembly to heavy thermal shocks once every cylinder revolution.

Unlike the deck assemblies known to date, the present inventive technology provides a filter deck assembly for a rotary drum filter that has a greater drainage surface, a more efficient filtering action, and is constructed and arranged to permit thermal expansion of the component elements without resultant damage. Furthermore, the present inventive technology provides a filter deck assembly that effectively prevents rewetting of the pulp sheet from a run back of the filtrate as the drum rotates through the descending path of the cycle. The present inventive technology also provides a filter deck assembly that is durable and has a long commercial life. Finally, the present inventive technology provides a filter deck assembly that is particularly constructed and arranged to allow simple and quick replacement of filter deck assembly sections.

The foregoing advantages are obtained in a rotary drum filter having a plurality of longitudinally and radially extending division grids mounted about the outer circumference of a drum. A plurality of corrugated sheets for drainage decks are provided, with the leading and trailing edges of each sheet mounted on circumferentially adjacent pairs of division grids to define filtrate compartments. An equivalent number of perforated filter decks or plates are also provided. Each filter deck or plate is attached to the top of a corrugated sheet (drainage deck) and has a leading edge that is set back from the leading edge of the attached corrugated sheet. An equivalent number of perforated cap strips (longitudinal cap strips) are attached to the tops of the division grids to keep the filter deck assemblies within their proper locations and ranges of movement, to allow maximum drainage and to allow ease of replacement of cap strips and filter deck assemblies.

A seal member is positioned in front of (partially or wholly) and/or underneath the leading edge, or in close proximity thereto, of each corrugated sheet (drainage deck). A seal clip is positioned and attached in front of and/or underneath the leading edge of each corrugated sheet and holds the seal member in place. The seal clip can be tack-welded or spot welded to the corrugated sheet, for example, and depending on the geometry, to the front and/or bottom of the corrugated sheet. When the seal member is positioned in front of and/or underneath the corrugated sheet, the seal member may be configured in a manner so that all or a portion of the seal member is located or pinched between the seal clip and the leading edge, or near the leading edge, of the corrugated sheet. The seal member is a compressible material that acts in conjunction with the seal clip to, among other things, seal the leading edge area of the drainage deck when the corresponding portion of the rotary drum is descending. It also assists with and maximizes the filter deck drainage area and deck pressure differential in the area of the seal clip.

Some of the problems with the prior art devices are the loss of drainage in the area corresponding to the seal member and the loss of pressure differential in that area. For example, the L-shaped seal member of U.S. Pat. No. 4,906,364 results in the loss of drainage in the area of the seal member and the loss of pressure differential in that area. The loss of drainage and pressure differential is detrimental to the capacity of the rotary drum filter and degrades washing efficiency. The present inventive technology provides additional drainage capacity and improved washing efficiency.

DETAILED DESCRIPTION OF EXEMPLARY ILLUSTRATIVE NON-LIMITING ARRANGEMENTS AND METHODS

The accompanying FIGURES schematically depict filter drums, filter deck assemblies, and configurations of filter deck assemblies, cap strips and grids that are exemplary, illustrative, non-limiting arrangements embodying the present inventive technology, including the method of use and replacement.

Figure 1:
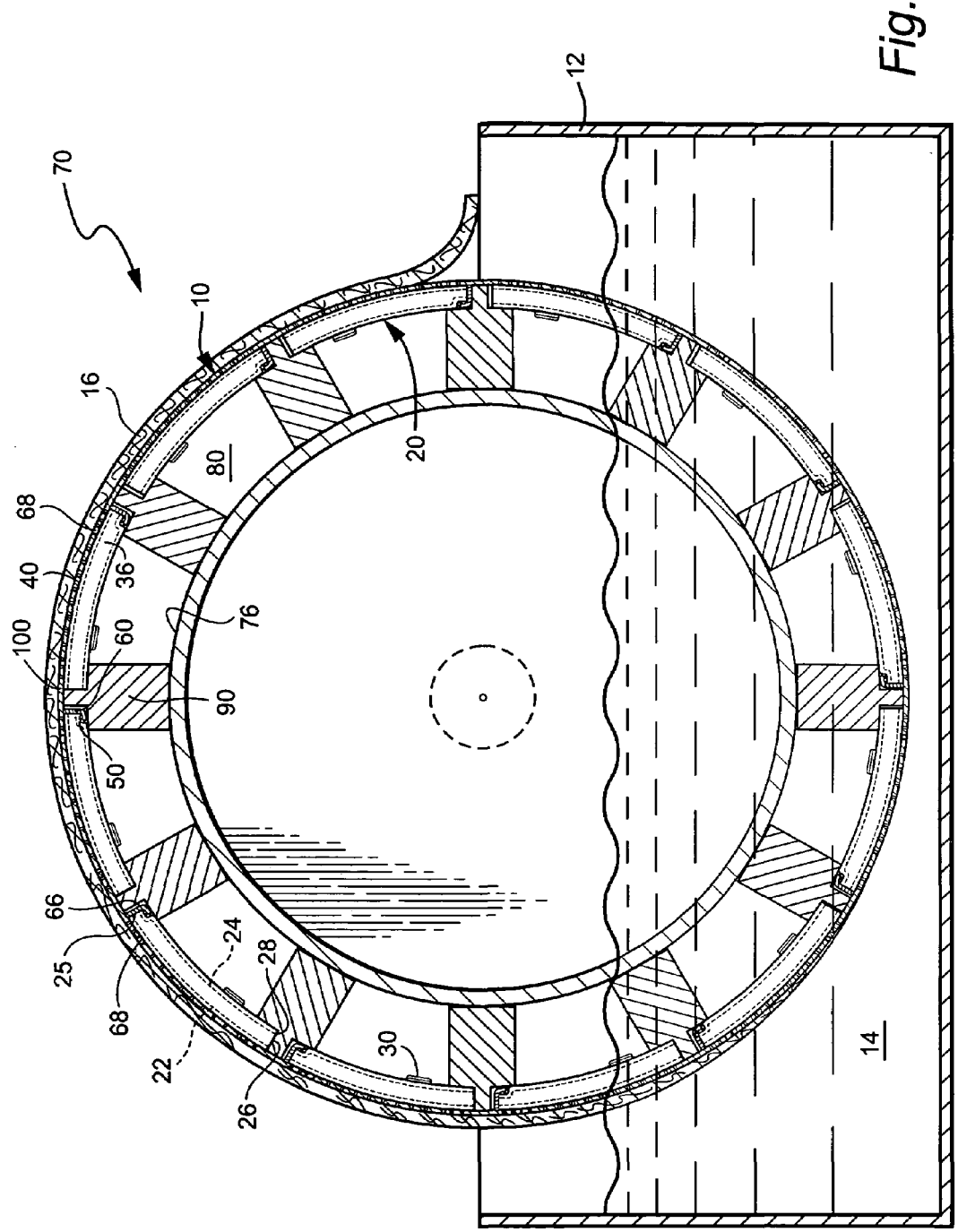
FIG. 1 is a schematic cross section of a drum filter according to an embodiment of the present invention.
Figure 2:
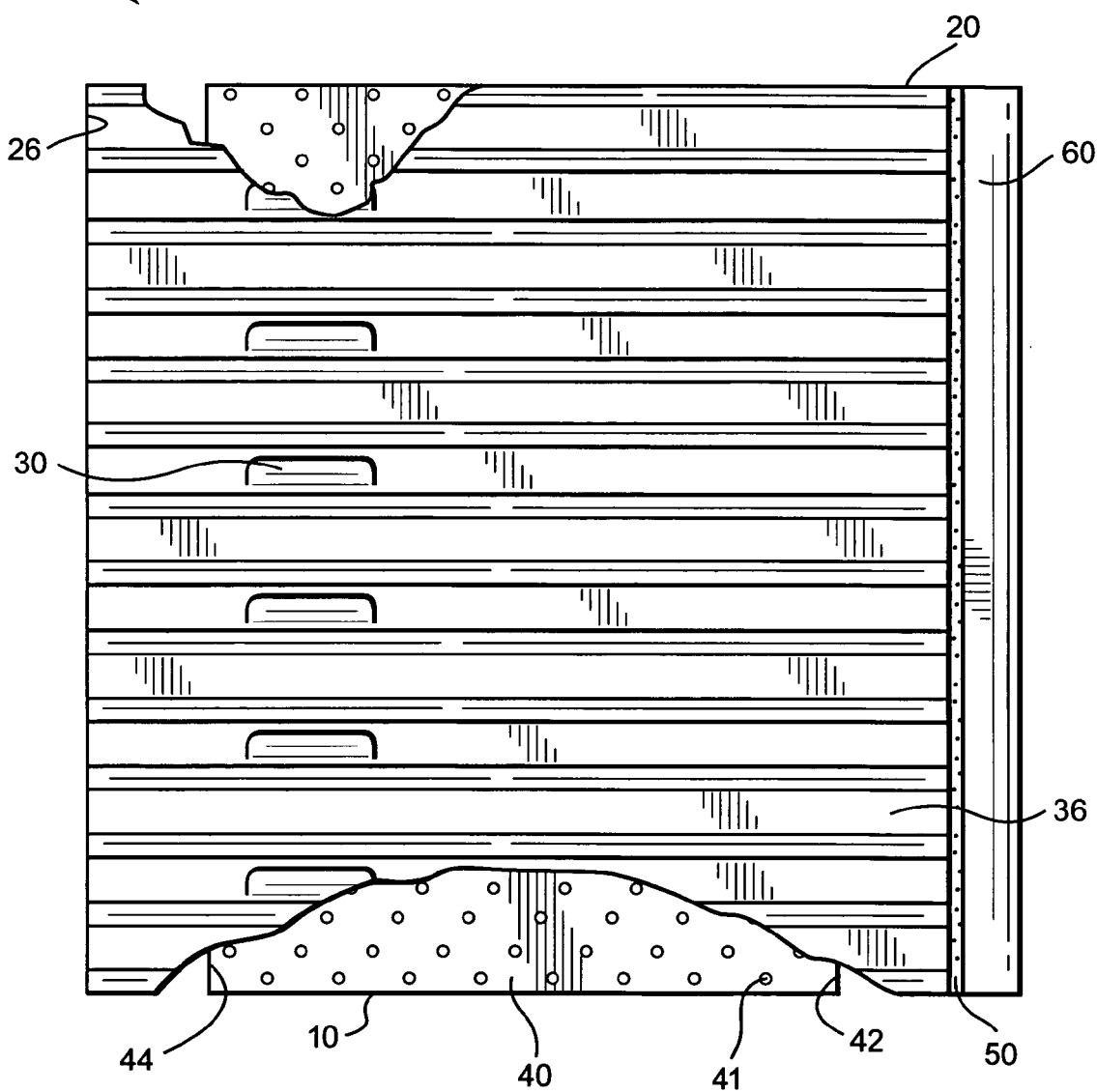
FIG. 2 is a bottom view of a filter deck assembly according to an embodiment of the present invention.

Referring now to the drawings, wherein similar referenced characters designate corresponding parts throughout the several views, the rotary drum filtering apparatus illustrated in FIGS. 1 and 2 comprises a drum structure, generally designated as 70, that is, at the user's place of business, at least partially submerged in a tank 12 that contains a pulp stock 14 or other slurry to be filtered. The drum is constructed in a conventional manner so that a pressure or vacuum is applied to drain filtrate and create a pulp sheet 16 on a filter deck assembly 18. For example, the pressure differential is created by the filtrate being atmospheric pressure and the drum being contained in a low pressure enclosure (typically about 3-5 psig). A vacuum assist could be applied to a filtrate pipe. The filter deck assembly 18 includes a filter deck 10 and a drainage deck 20.

As shown in FIG. 1, a plurality of longitudinally extending division grids 90 are mounted on the drum surface 76. The grids are parallel and are spaced evenly about the outer surface of the drum to form filtrate compartments 80 inside the deck assembly. The filter deck assemblies 18 and cap strips 100 (longitudinal cap strips) have an appropriate circumferential radius to form a smooth cylindrical outer deck surface around the drum structure.

As can be seen in the preferred embodiments of FIGS. 2-7, the drainage deck 20 consists of a square or rectangularly shaped corrugated sheet 36 having alternating ridges 22 and channels 24. Typical deck assembly dimensions are about ten (10) inches (circumferentially on the drum) by about seventy-nine (79) inches (longitudinally across the drum) or a length appropriate to ease manufacturing and fit the length of the cylinder. The ridges and channels extend in the direction of drum rotation from a leading edge 25 of the sheet to a trailing edge 26. The corrugated sheet 36 is preferably a corrosion resistant metal such as stainless steel or titanium.

Slots, holes or perforations 30 are provided near the trailing edge of each channel 24 for communicating filtrate from the drainage deck to the filtrate compartments. Due to the location of slots, holes or perforations 30 and their operation during the cycle, filtrate flows from the drainage deck 20 into the filtrate compartments 80 during the ascending portion of the drum travel. During the descending portion of travel, the trailing edge location of slots, holes or perforations 30 coupled with the leading edge 25 sealing action of sealing member 50 and sealing clip 60 prevents leakage of filtrate from the filtrate compartments 80 which would cause rewetting of the pulp sheet 16.

The filter deck 10 consists of a square or rectangular metal plate 40 that is attached to the top of a corresponding corrugated sheet 36. The filter plate 40 is perforated with fine holes, slots or apertures 41 and is preferably a corrosion resistant metal such as stainless steel or titanium. The filter plate 40 is preferably drilled in its entirety with preferably 1 mm diameter holes on preferably 2 mm centers. The filter plate 40 is preferably attached to some or all of the tops of the ridges 22 of the corrugated sheet 36 by suitable welds. Preferably, the attachment spot welds (drilled plate to corrugated sheet) can be in the drilled holes. The diameter of the spot weld (and quantity of them) can create sufficient attachment. The leading edge 42 of the filter plate 40 is set back from the leading edge 25 of the attached corrugated sheet 36.

Although not critical to the invention, the filter plate 40 does not necessarily extend past the edges of the corrugated sheet. Instead, an additional piece of metal (e.g., steel that is or is not perforated like the filter plate) is welded to the corrugated sheet and fits into a circumferential step (similar to half of a division grid) machined into the cylinder. Another (circumferential) cap strip overlaps this additional piece of metal (e.g., steel) and helps assist with the "floatation" (movement) of the deck assembly. Stated another way, the deck assembly is not attached on its perimeter. Instead, a "tab" is created and attached to the corrugation. This tab is "overlapped" by a different (circumferential) cap strip. The nature of this attachment is not instrumental to the invention and can take the form of conventional drum filter machines. On a typical drum filter (over three meters long), there would be three circumferential cap strips, one on each end ring and one on a center ring.

As in typical rotary drum filters, an end ring can be and can look very similar to a "one sided" division grid. The step that the seal clip may rest upon may be on an appropriate radius to meet the radius of the deck plate. The end ring cap strip may be continuous. The division grid cap strip may abut to it. The height may be the same as the division grid. A center ring may be similar to a "short" two-sided division grid. It may look like an inverted "T." A groove may be machined into the drum for this ring to mount and steps may be machined into it. It may be "short" (i.e., does not extend to the cylinder wrapper plate) to allow filtrate to flow from one end of the machine to the filtrate discharge end.

In essence, a plane may be established by the cap-strips. This can restrain the deck from "coming up." The deck assembly can be supported by steps around its perimeter. The division grid steps may be on one plane and the center ring and end ring may be on another. The division grip may support the deck underneath the corrugation. The center and end rings may be supported by clips welded to the underneath of a corrugation "peak" (see FIG. 3 where item 22 points).

Figure 3:
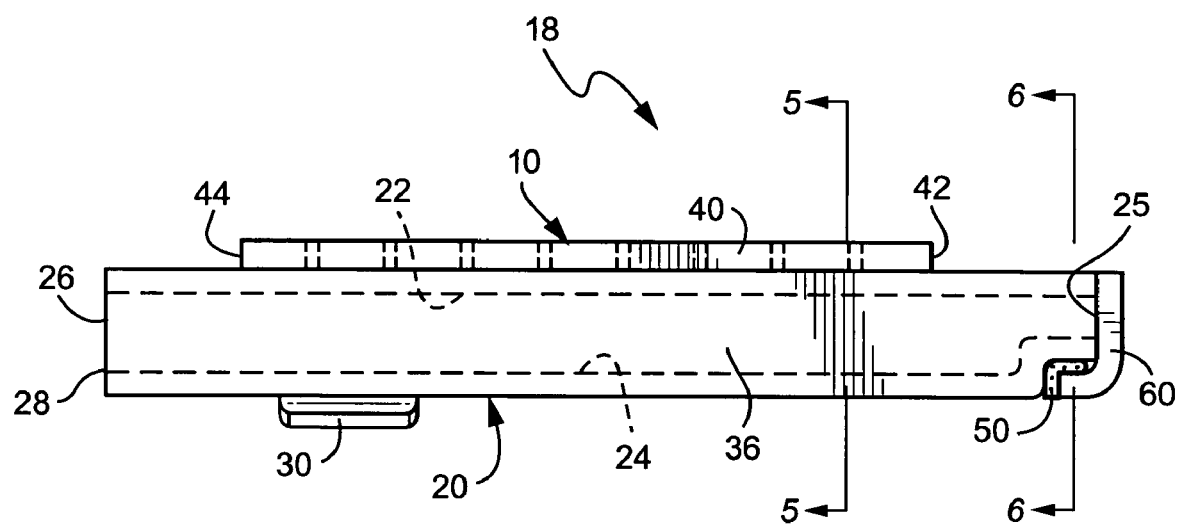
FIG. 3 is a side view of a filter deck assembly according to an embodiment of the present invention as depicted in FIG. 2.
Figure 4:
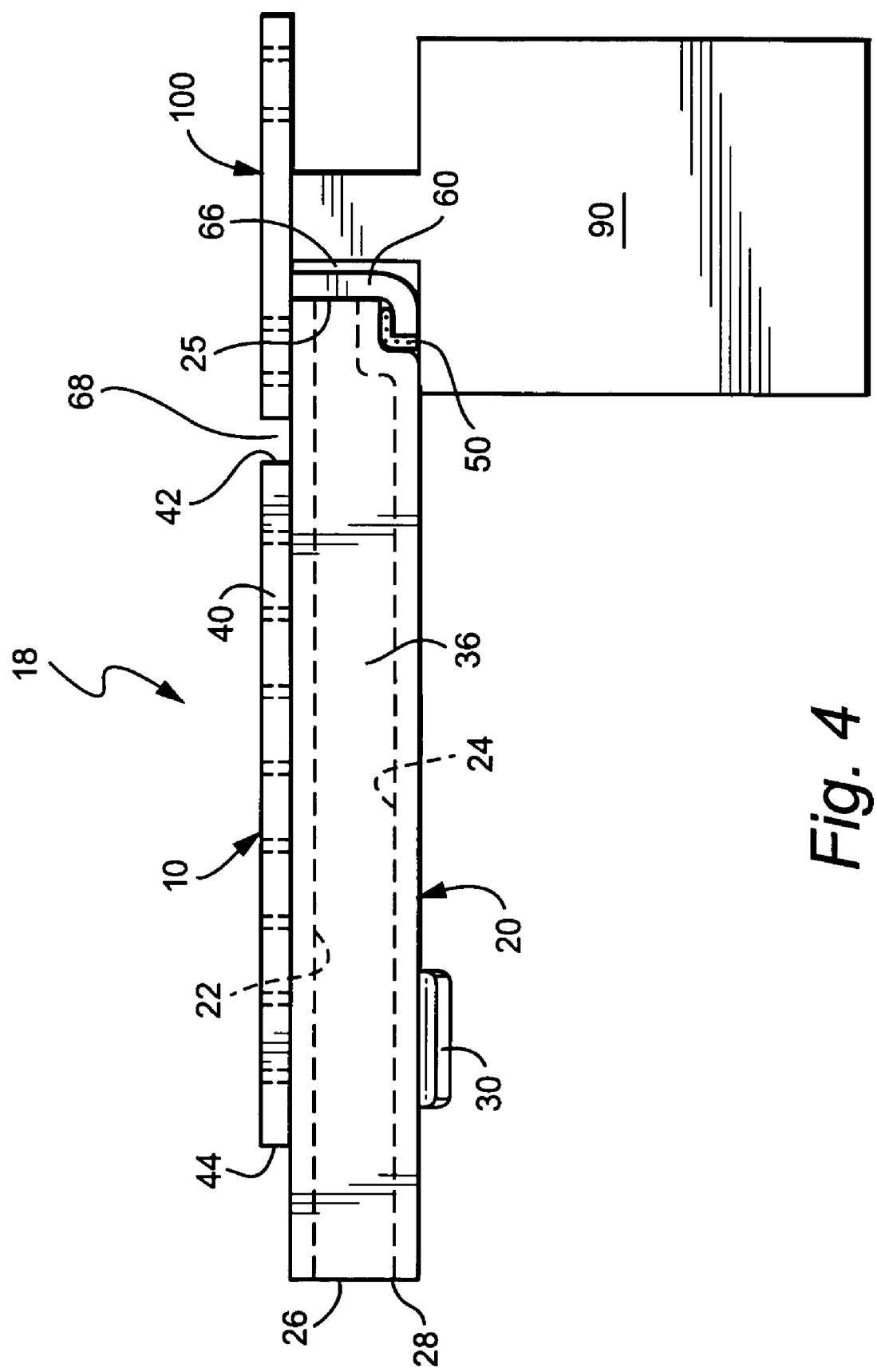
FIG. 4 is a side view of a filter deck assembly and division grid according to an embodiment of the present invention as depicted in FIG. 2.
Figure 5:
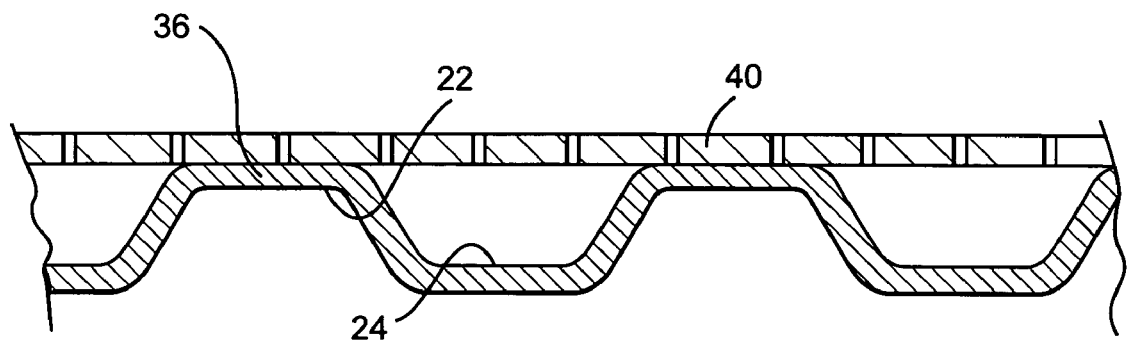
FIG. 5 is a cross sectional view at 5-5 of FIG. 3.
Figure 6:
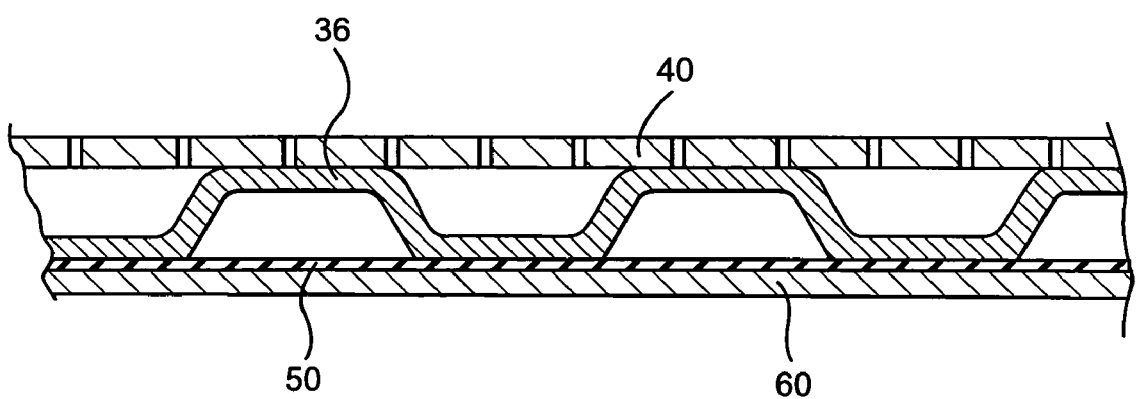
FIG. 6 is a cross sectional view at 6-6 of FIG. 3.
Figure 7:
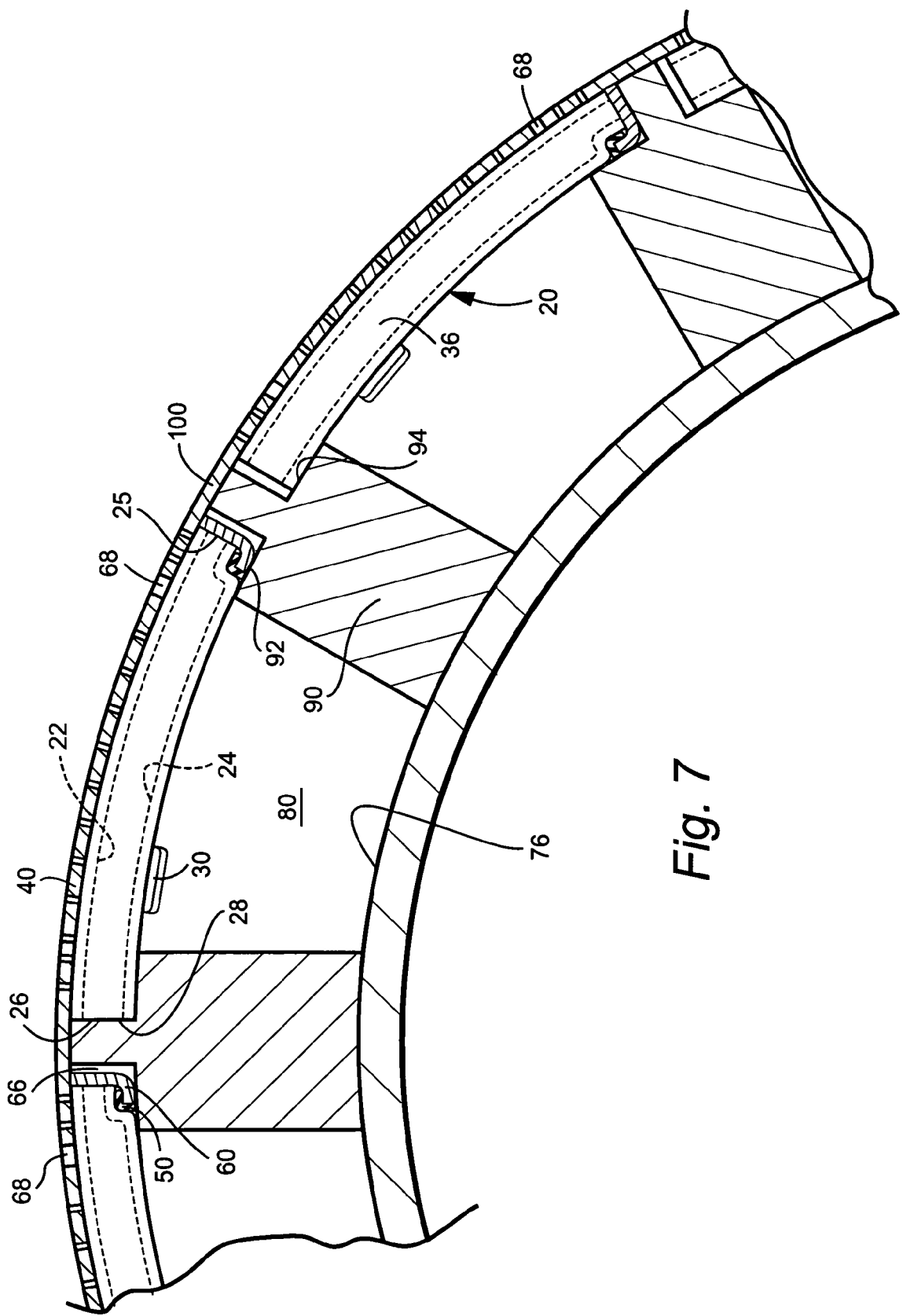
FIG. 7 is a side view of a portion of a drum filter, including filter deck assemblies, cap strips and division grids according to an embodiment of the present invention as depicted in FIG. 2.

In preferred embodiments such as those of FIGS. 2 and 3, the leading edge 42 and the trailing edge 44 of the filter plate 40 do not extend beyond the leading edge 25 and the trailing edge 26 of the corrugated sheet 36. In further preferred embodiments, the leading edge 42 is set back so that the resulting gap 68 is slightly larger than (or at most equal to) the resulting gap 66. In other words, when in descending operation, the seal clip 60 on the corrugated sheet 36 can contact the division grid 90, which then prevents filter plate 40 from contacting the cap strip 100 (or, when the gaps are equal, prevent filter plate 40 from contacting cap strip 100 forcefully). This advantageously extends the life of the filter plate 40 and cap strip 100, and it further improves their combined and increased filtering capacity without affecting the integrity of the filter deck panel assembly.

In preferred embodiments such as FIGS. 2-7, a sealing member 50 is positioned near the underneath leading edge 25 of each corrugated sheet 36 and is engaged between a sealing clip 60 and the modified leading edge 25 of corrugated sheet 36 as shown in FIG. 3. The sealing member 50 is a compliant material and preferably abuts the corrugated sheet 36 so as to close any gap between the sealing clip 60 and the corrugated sheet 36. The sealing member 50 and sealing clip 60 prevent filtrate in the filtrate compartment 80 from leaking back into the channels of the drainage deck 20 and rewetting the pulp sheet 16.

The sealing clip 60 is preferably solid sheet material, and it is preferably the same material as used for the corresponding corrugated sheet, which avoids deleterious component interaction and temperature change problems. The sealing clip 60 is preferably welded to the leading edge 25 of the corrugated sheet 36. The thickness of the sealing clip 60 can be between about 0.5 and about 4.0 millimeters.

The sealing member 50 is preferably engaged between the sealing clip 60 and the corrugated sheet 36 by the clamping action of the sealing clip 60 or a conventional means of engaging. For example, the seal clip 60 may contain the seal member 50 by clamping it in position prior to the welding of the seal clip 60 to the leading edge of the corrugated sheet 36 or portions thereof. Teflon, EPDM (ethylene-propylene rubber), Viton, Gore-Tex and/or another compressible material, or combination of material that acts in a compressible fashion, are suitable materials for the sealing member 50. The sealing member 50 can be relatively thin, for example, between about 1.0 and about 4.0 millimeters in thickness. The sealing member 50 can extend beyond the bottommost portion of the corrugated sheet 36.

Figure 8:
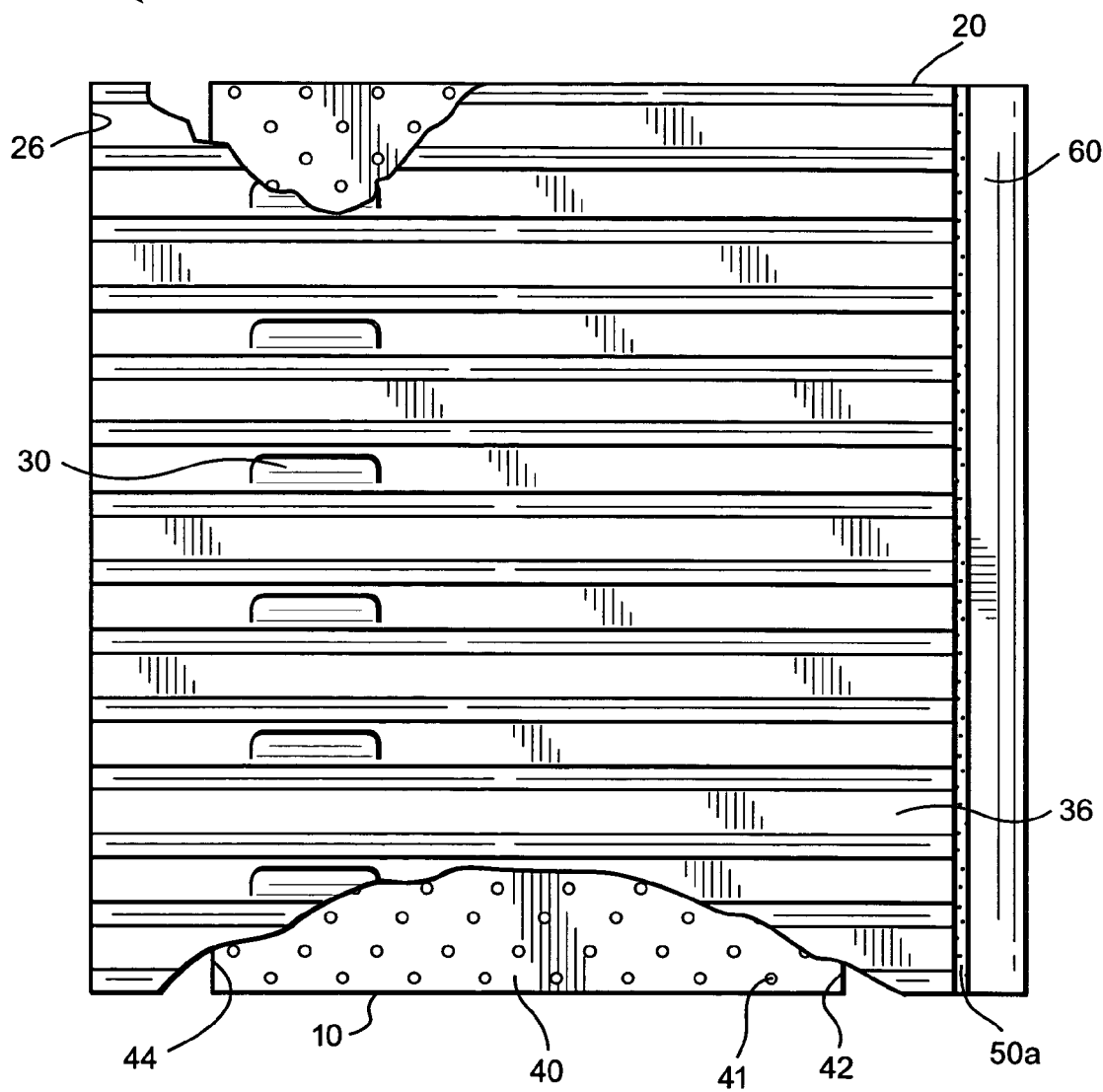
FIG. 8 is a bottom view of a filter deck assembly according to another embodiment of the present invention.
Figure 9:
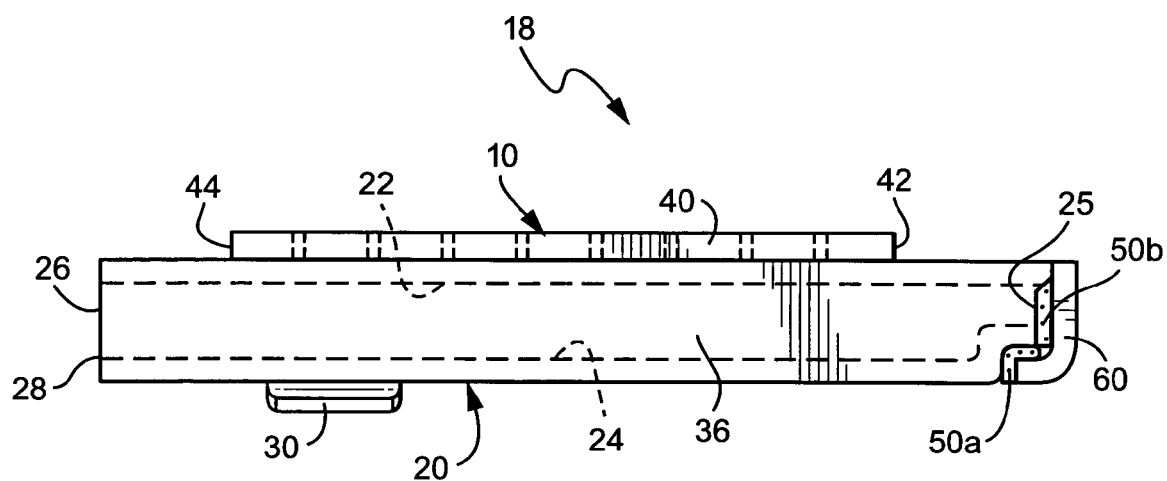
FIG. 9 is a side view of a filter deck assembly according to an embodiment of the present invention as depicted in FIG. 8.
Figure 10:
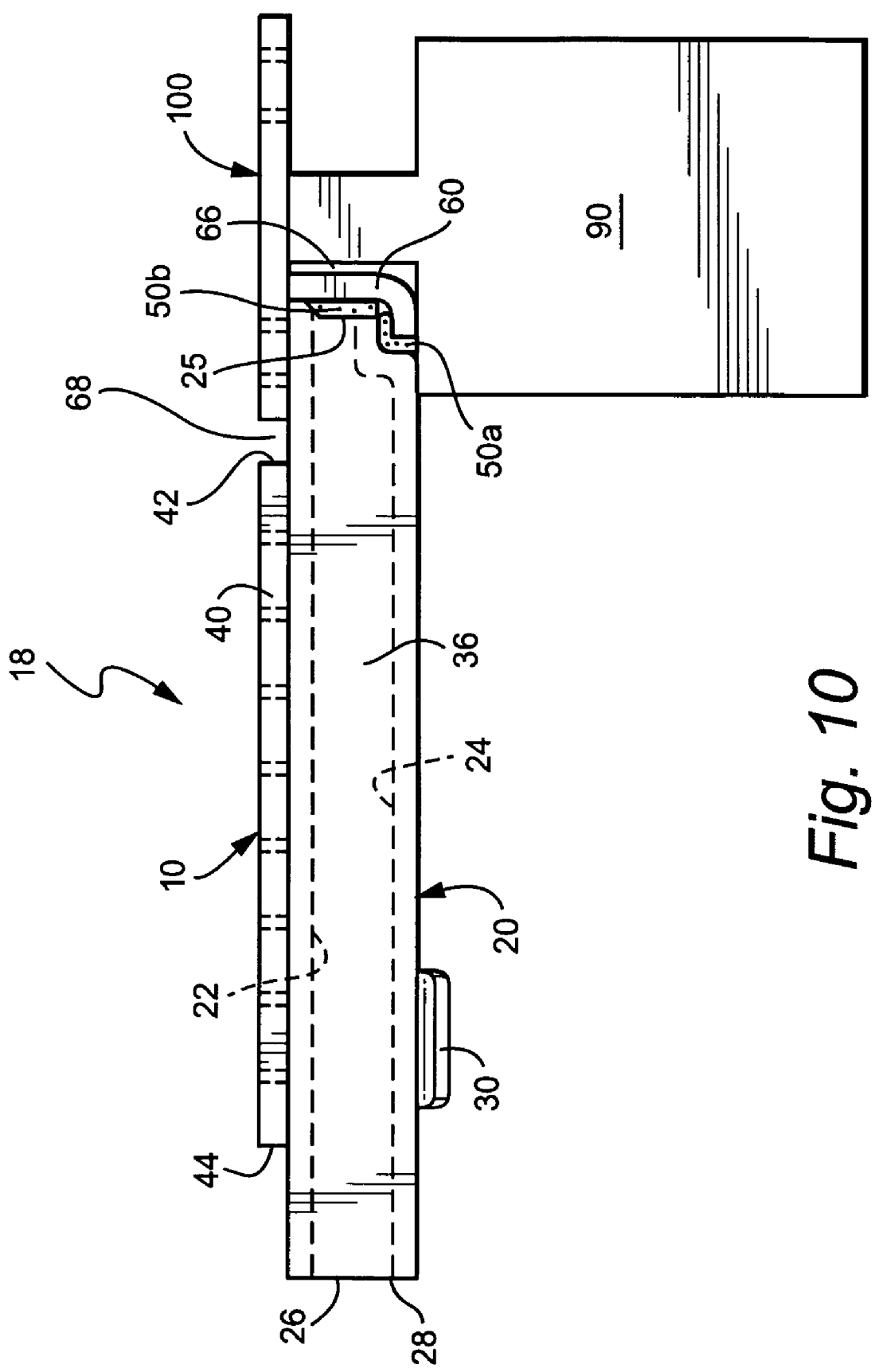
FIG. 10 is a side view of a filter deck assembly and division grid according to an embodiment of the present invention as depicted in FIG. 8.
Figure 11:
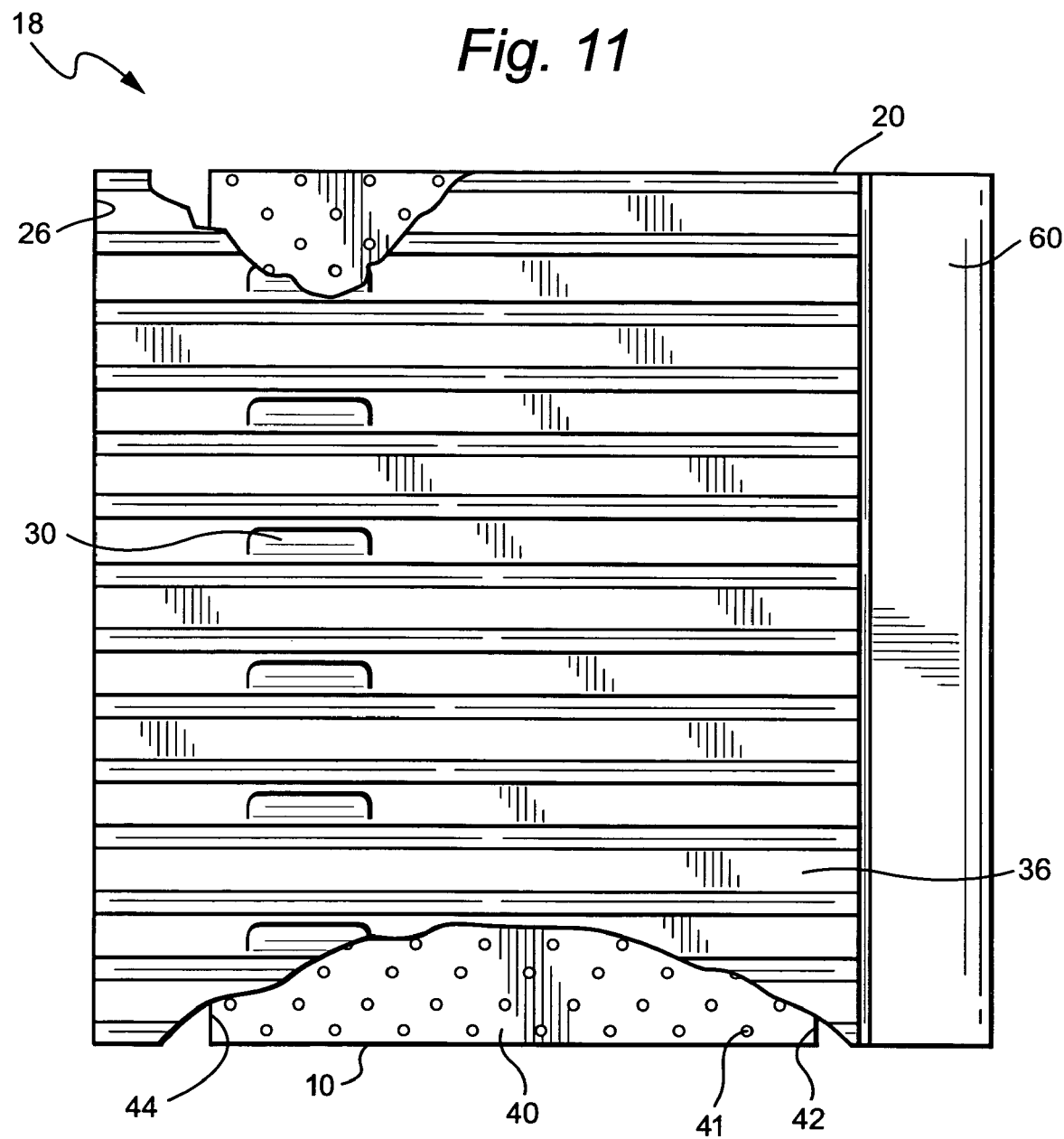
FIG. 11 is a bottom view of a filter deck assembly according to another embodiment of the present invention.

In other preferred embodiments such as those of FIGS. 8-10, a second sealing member 50b, or continuous sealing member 50a and 50b (i.e., wherein sealing members 50a and 50b are one continuous sealing member and are not separate members as shown in FIG. 9), is positioned near the face of leading edge 25 of each corrugated sheet 36 and is engaged between a sealing clip 60 and the modified leading edge of corrugated sheet 36 as shown in FIG. 9. The sealing members 50a and 50b (or one continuous sealing member) are a compliant material and substantially abut the leading and underneath edges of corrugated sheet 36 so as to effectively close any gap between the sealing members 50a and 50b and the leading edge of corrugated sheet 36. The sealing clip 60 clamps the sealing members and is welded to the corrugated sheet. The lower portion of sealing member 50a (like the lower portions of sealing members 50 in FIGS. 3 and 17) can extend beyond the bottommost portion of corrugated sheet 36. The nature of the sealing member (50a in FIG. 9, 50 in FIGS. 3 and 17) is to seal between sealing clip 60 and grid 90. Sealing member 50b can provide (if necessary) additional leakage protection.

The sealing members 50a and 50b (or one continuous sealing member) and sealing clip 60 prevent filtrate in the filtrate compartment 80 from leaking back into the channels of the drainage deck 20 and rewetting the pulp sheet 16 during descent. In addition, when the rotary drum filter is in operation, the assembly may slide forward toward the division grid 90 (for example, as originally set up, as develops over time during operation of the rotary drum filter, or when a filter deck panel assembly is on a descending path) such that the sealing members 50a and 50b (or one continuous sealing member) and the sealing clip 60 can be substantially pinched between the leading edge 25 of the corrugated sheet 36 and the division grid 90 and thereby further prevent filtrate in the filtrate compartment 80 from leaking back into the channels of the drainage deck 20 and rewetting the pulp sheet 16.

In the preferred embodiments such as those of FIGS. 8-10, the sealing clip 60 is preferably solid sheet material, and it is preferably the same material as used for the corresponding corrugated sheet 36, which avoids deleterious component interaction and temperature change problems. The sealing clip 60 is preferably welded to a portion of the leading edge 25 of the corrugated sheet 36. It can be welded at the top leading edge of the corrugated sheet or other portions, and must be capable of substantially holding the sealing members 50a and 50b (or one continuous sealing member) in place, e.g., to ensure that the sealing members 50a and 50b (or one continuous sealing member) are/is substantially held in position when the rotary drum filter is in operation. The thickness of the sealing clip 60 can be between about 0.5 and about 4.0 millimeters.

In the preferred embodiments such as those of FIGS. 8-10, the sealing members 50a and 50b (or one continuous sealing member) are/is preferably engaged between the sealing clip 60 and the corrugated sheet 36 by the clamping action of the sealing clip 60 or a conventional means of engaging. For example, the "J" or reverse "L" shaped seal clip 60 may contain the sealing members 50a and 50b (or one continuous sealing member) by clamping them/it in position prior to the welding of the seal clip 60 to the top leading edge of the corrugated sheet 36 or portions thereof. Teflon, EPDM (ethylene-propylene rubber), Viton, Gore-Tex and/or another compressible material, or combination of material that acts in a compressible fashion, are suitable materials for the sealing members 50a and 50b (or one continuous sealing member). The sealing members 50a and 50b (or one continuous sealing member) can be relatively thin, for example, between about 1.0 and about 4.0 millimeters in thickness.

Figure 12:
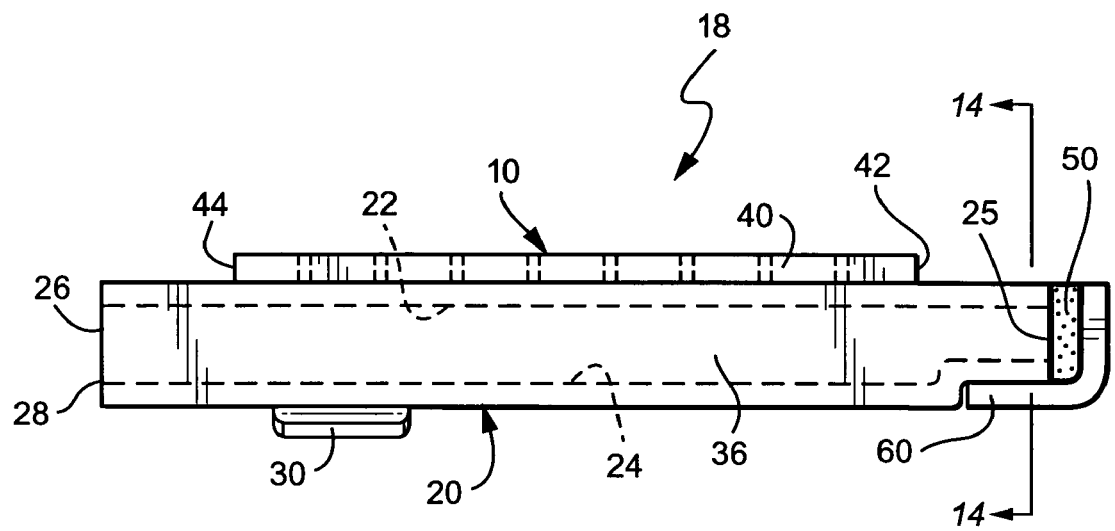
FIG. 12 is a side view of a filter deck assembly according to an embodiment of the present invention as depicted in FIG. 11.
Figure 14:
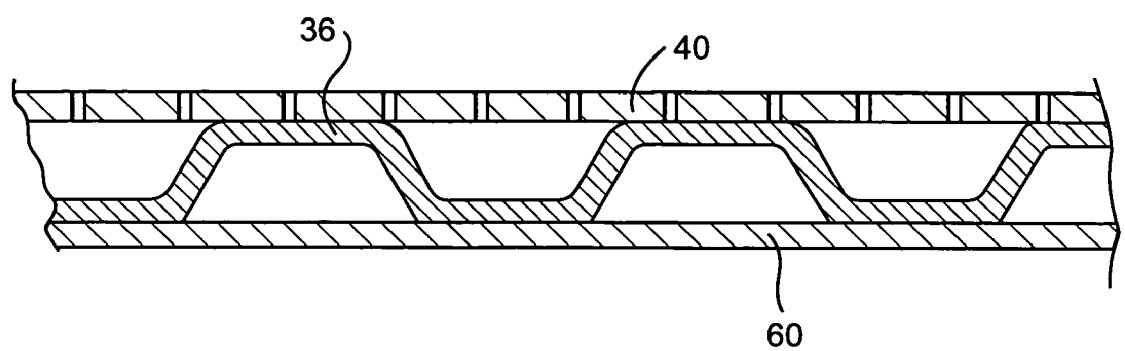
FIG. 14 is a cross sectional view at 14-14 of FIG. 12.
Figure 13:
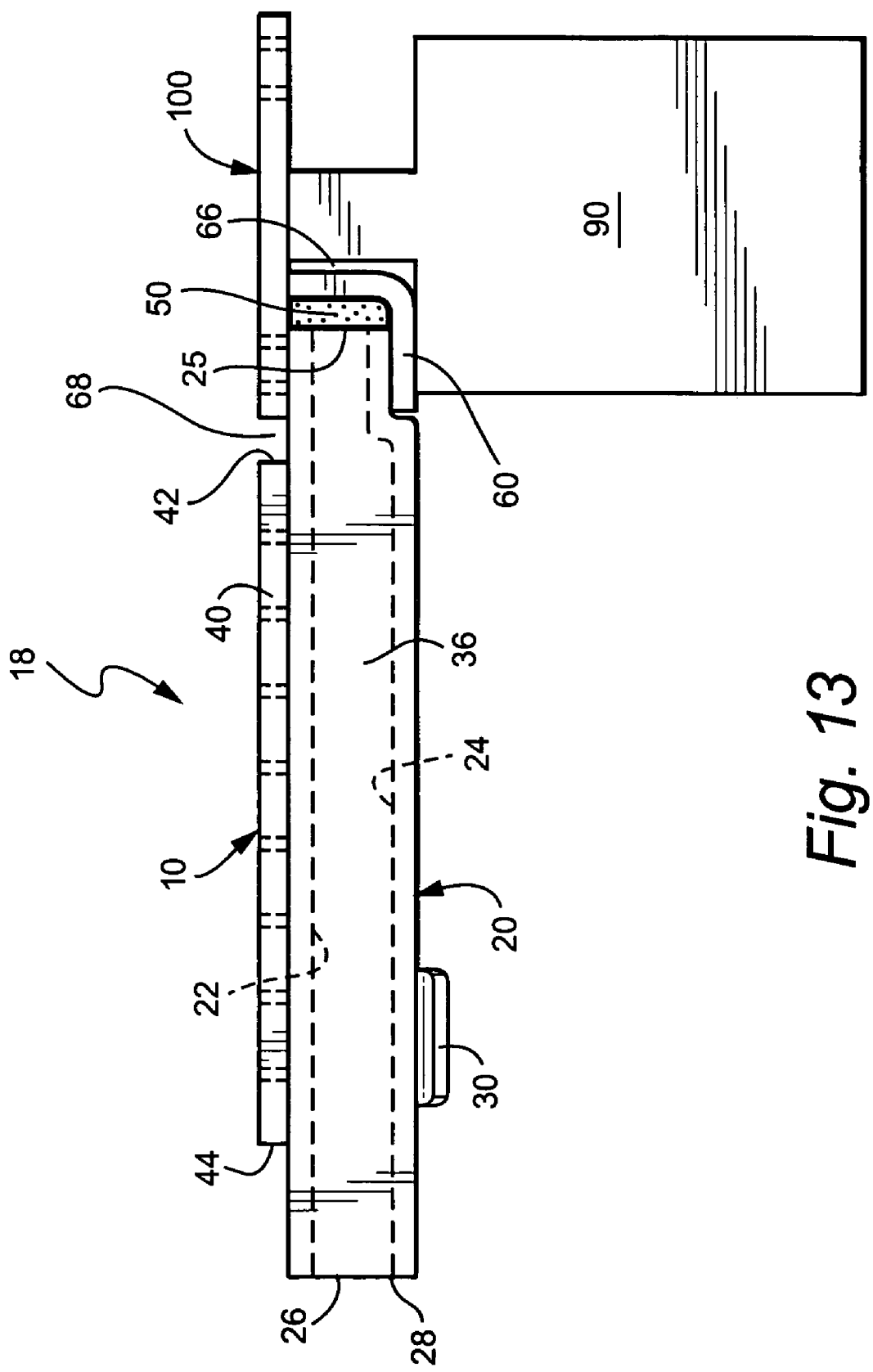
FIG. 13 is a side view of a filter deck assembly and division grid according to an embodiment of the present invention as depicted in FIG. 11.
Figure 15:
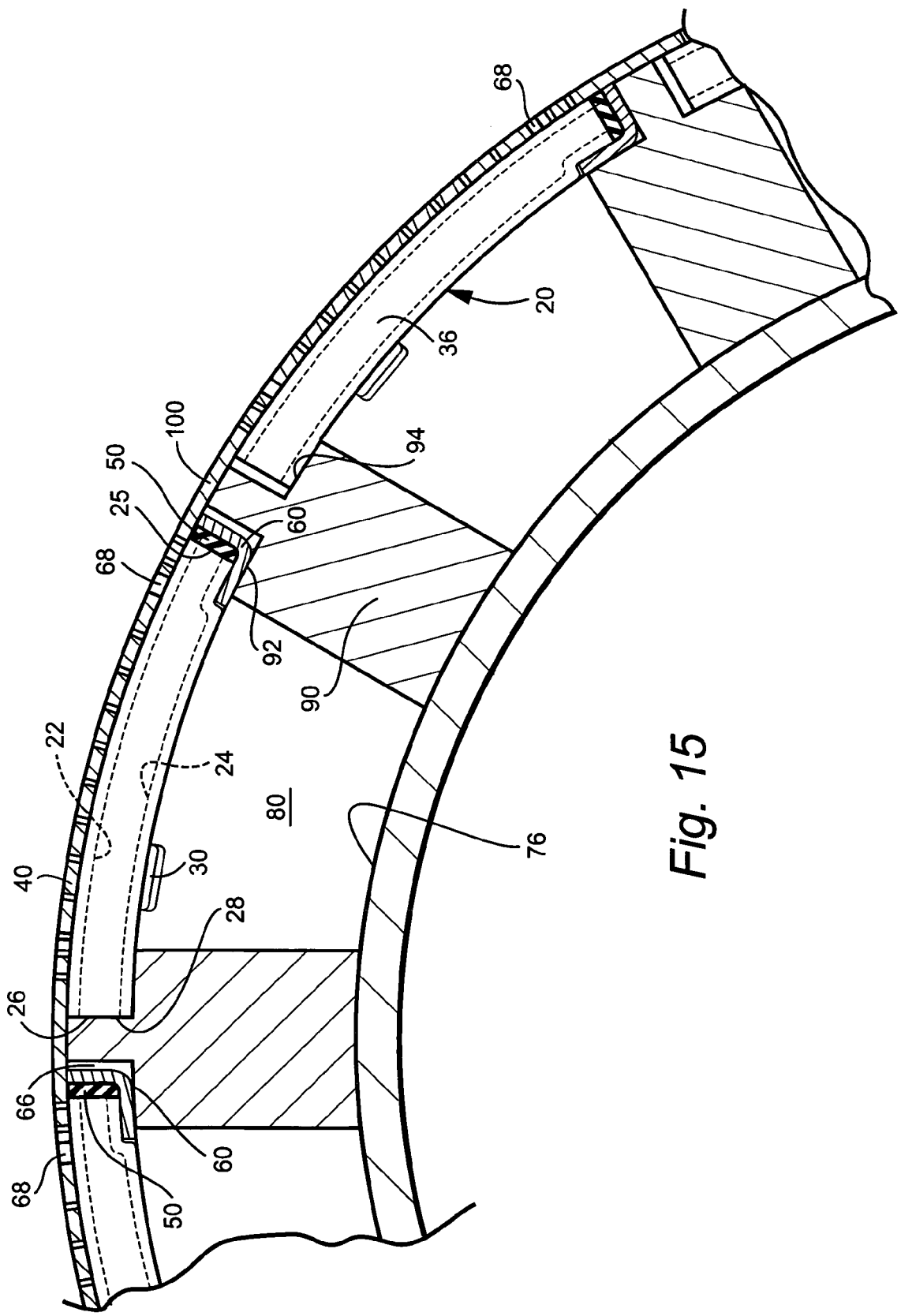
FIG. 15 is a side view of a portion of a drum filter, including filter deck assemblies, cap strips and division grids according to an embodiment of the present invention as depicted in FIG. 11.

In other preferred embodiments such as those of FIGS. 11-15, a sealing member 50 is positioned near the face of leading edge 25 of each corrugated sheet 36 and is engaged between a sealing clip 60 and the modified leading edge of corrugated sheet 36 as shown in FIG. 12. The sealing member 50 is a compliant material and substantially abuts the leading edge of corrugated sheet 36 so as to effectively close any gap between the sealing member 50 and the leading edge of corrugated sheet 36. The sealing clip 60 clamps the sealing member and is welded to the corrugated sheet.

The sealing member 50 and sealing clip 60 prevent filtrate in the filtrate compartment 80 from leaking back into the channels of the drainage deck 20 and rewetting the pulp sheet 16 during descent. In addition, when the rotary drum filter is in operation, the assembly may slide forward toward the division grid 90 (for example, when a filter deck panel assembly is on a descending path) such that the sealing member 50 and the sealing clip 60 can be substantially pinched between the leading edge 25 of the corrugated sheet 36 and the division grid 90 and thereby further prevent filtrate in the filtrate compartment 80 from leaking back into the channels of the drainage deck 20 and rewetting the pulp sheet 16.

In the preferred embodiments such as those of FIGS. 11-15, the sealing clip 60 is preferably solid sheet material, and it is preferably the same material as used for the corresponding corrugated sheet 36, which avoids deleterious component interaction and temperature change problems. The sealing clip 60 is preferably welded to a bottom (or underneath) portion of the leading edge 25 of the corrugated sheet 36, and must be capable of substantially holding the sealing member 50 in place, e.g., to ensure that the sealing member 50 is substantially held in position when the rotary drum filter is in operation. The thickness of the sealing clip 60 can be between about 0.5 and about 4.0 millimeters.

In the preferred embodiments such as those of FIGS. 11-15, the sealing member 50 is preferably engaged between the sealing clip 60 and the corrugated sheet 36 by the clamping action of the sealing clip 60 or a conventional means of engaging. For example, the elongated "J" elongated reverse "L" shaped (or "J" shaped or reverse L-shaped) seal clip 60 may contain the sealing member 50 by clamping it in position prior to the welding of the seal clip 60 to the bottom (or underneath) leading edge of the corrugated sheet 36 or portions thereof. Teflon, EPDM (ethylene-propylene rubber), Viton, Gore-Tex and/or another compressible material, or combination of material that acts in a compressible fashion, are suitable materials for the sealing member 50. The sealing member 50 can be relatively thin, for example, between about 1.0 and about 4.0 millimeters in thickness.

Figure 16:
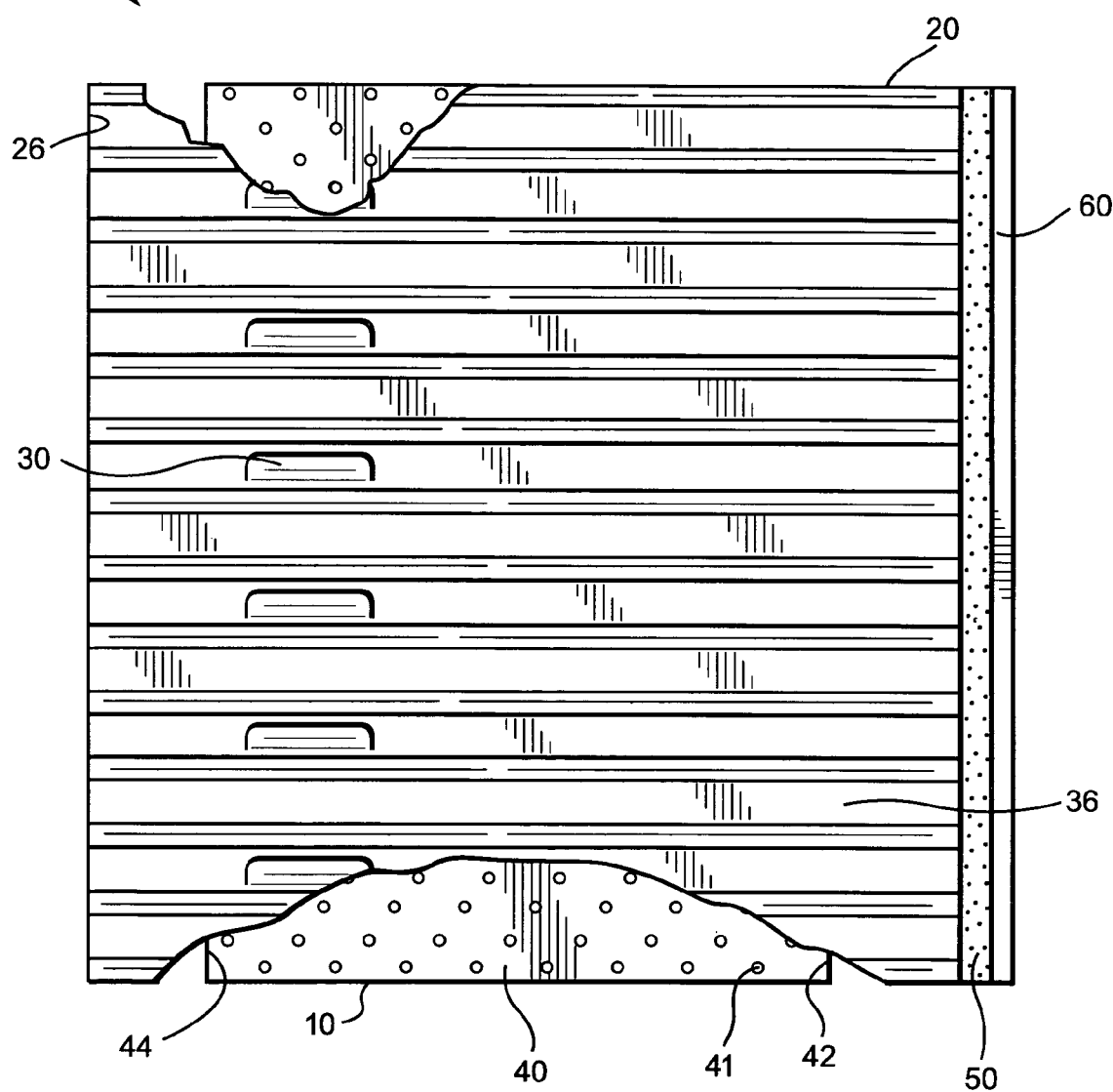
FIG. 16 is a bottom view of a filter deck assembly according to another embodiment of the present invention.
Figure 17:
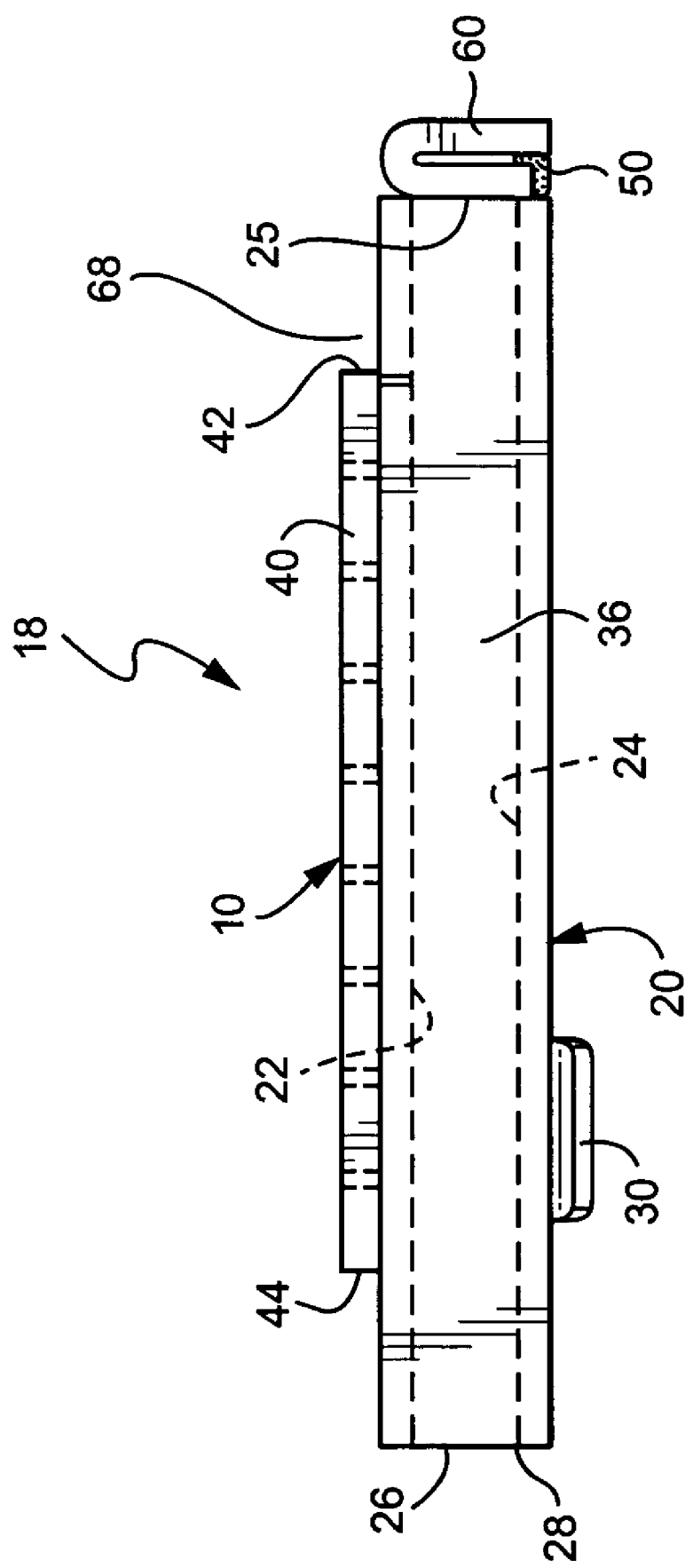
FIG. 17 is a side view of a filter deck assembly according to an embodiment of the present invention as depicted in FIG. 16.
Figure 18:
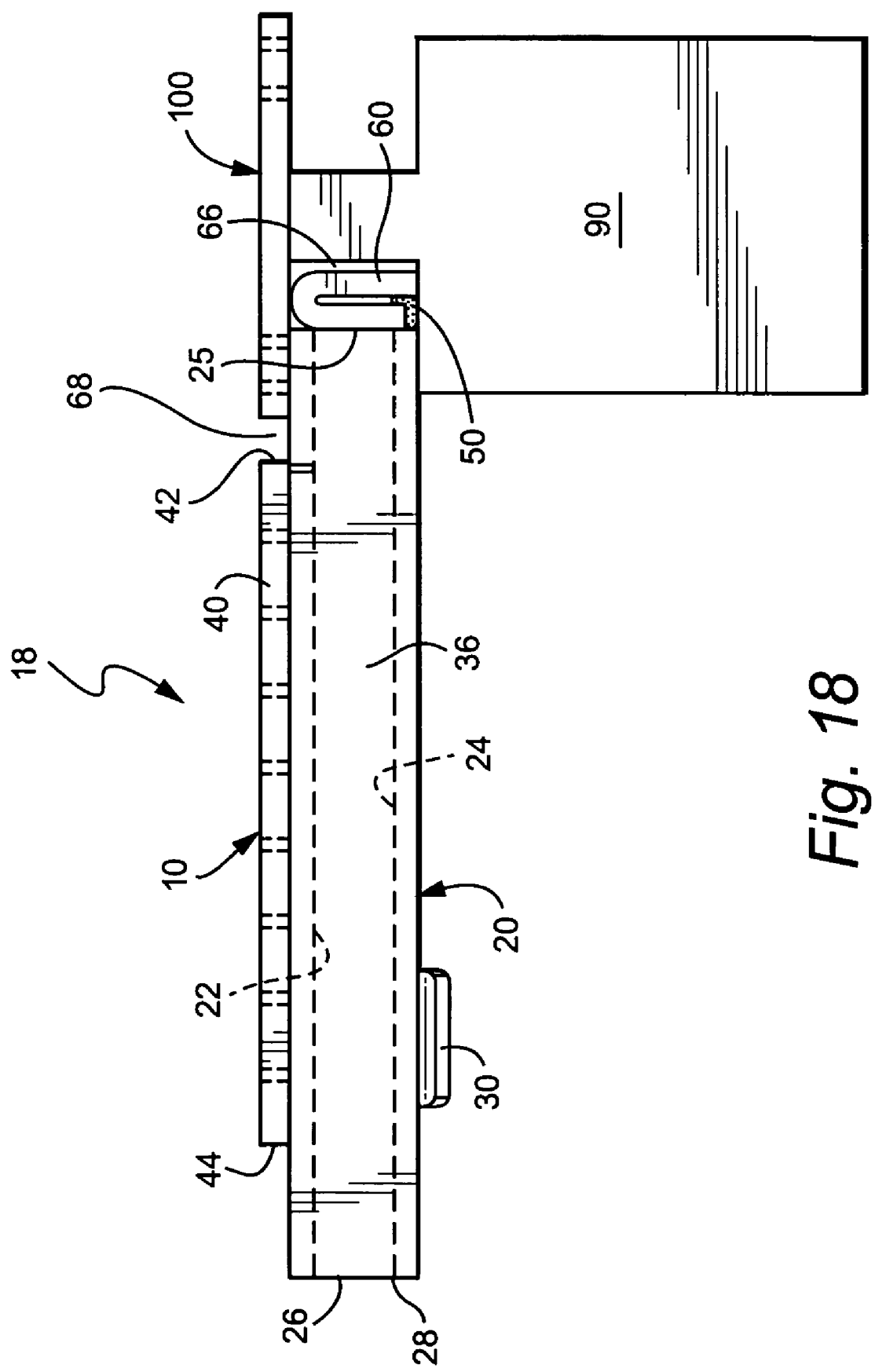
FIG. 18 is a side view of a filter deck assembly and division grid according to an embodiment of the present invention as depicted in FIG. 16.

In other embodiments such as those of FIGS. 16-18, a sealing member 50 is positioned near the lower face of leading edge 25 of each corrugated sheet 36 and is engaged between a sealing clip 60 and the unmodified leading edge of corrugated sheet 36 as shown in FIG. 17. The sealing member 50 is a compliant material and abuts the lower leading edge of corrugated sheet 36. The sealing clip 60 clamps the sealing member and is welded to the corrugated sheet. The lower portion of sealing member 50 (like the lower portions of sealing member 50 in FIG. 3 and 50a in FIG. 9) can extend beyond the bottommost portion of corrugated sheet 36. The nature of the sealing member (50a in FIG. 9, 50 in FIGS. 3 and 17) is to seal between sealing clip 60 and grid 90.

The sealing member 50 and sealing clip 60 prevent filtrate in the filtrate compartment 80 from leaking back into the channels of the drainage deck 20 and rewetting the pulp sheet 16 during descent. In addition, when the rotary drum filter is in operation, the assembly may slide forward toward the division grid 90 (for example, as originally set up, as develops over time during operation of the rotary drum filter, or when a filter deck panel assembly is on a descending path) such that the sealing member 50 and the sealing clip 60 can be substantially pinched between the leading edge 25 of the corrugated sheet 36 and the division grid 90 and thereby further prevent filtrate in the filtrate compartment 80 from leaking back into the channels of the drainage deck 20 and rewetting the pulp sheet 16.

In the embodiments such as those of FIGS. 16-18, the sealing clip 60 is preferably solid sheet material, and it is preferably the same material as used for the corresponding corrugated sheet 36, which avoids deleterious component interaction and temperature change problems. The sealing clip 60 is preferably welded to a portion of the leading edge 25 of the corrugated sheet 36, and must be capable of substantially holding the sealing member 50 in place, e.g., to ensure that the sealing member 50 is substantially held in position when the rotary drum filter is in operation. The thickness of the sealing clip 60 can be between about 0.5 and about 4.0 millimeters.

In the embodiments such as those of FIGS. 16-18, the sealing member 50 is preferably engaged between the sealing clip 60 and the corrugated sheet 36 by the clamping action of the sealing clip 60 or a conventional means of engaging. For example, a "U" shaped seal clip 60 may contain the sealing member 50 by clamping it in position prior to the welding of the seal clip 60 to the leading edge of the corrugated sheet 36 or portions thereof. Teflon, EPDM (ethylene-propylene rubber), Viton, Gore-Tex and/or another compressible material, or combination of material that acts in a compressible fashion, are suitable materials for the sealing member 50. The sealing member 50 can be relatively thin, for example, between about 1.0 and about 4.0 millimeters in thickness.

As seen in FIGS. 1, 4, 7, 10, 13, 15 and 18, the longitudinally extending division grids 90 are provided with two shoulder portions 92 and 94, one on each longitudinal face of the grid. The shoulders are adapted to support the leading edge 25 portion of one corrugated sheet 36 and the trailing edge 26 portion of a circumferentially adjacent corrugated sheet. The shoulders on each grid can be of equal lengths or differing lengths in either direction, as desired, so long as they support the corrugated sheets and allow proper movement. The gap 66 between the grid 90 and the drain deck 20 allows for thermal expansion. Additionally, the gap 68 between the filter deck 10 and cap strip 100 allows for thermal expansion.

An embodiment of the invention includes a cap strip 100 to provide a free floating deck assembly as shown in FIGS. 1, 4, 7, 10, 13, 15 and 18. In this embodiment, the leading edge of the filter plate 40 is set back from the leading edge 25 of the corrugated sheet 36, and the trailing edge 44 of the filter plate 40 is set back from the trailing edge 26 of the corrugated sheet 36. The size of gap 68 must be greater than or equal to gap 66; otherwise, the cap strip 100 may shear off.

Preferably, the longitudinally extending cap strip 100 is attached to the division grid 90 to overlap the leading and trailing edges of the adjacent corrugated sheets 36. Only the cap strip 100 may be attached, preferably by suitable welds, to the division grid 90. The cap strips 100 have fine perforations, slots or other apertures as shown in the FIGURES (and like the fine perforations, slots or other apertures in the filter plates 40 as described and shown in the FIGURES). However, unlike the perforated filter plates 40, it is preferred that the cap strips are not drilled/perforated in the area of the welding to the division grids. The design of the subject invention, including the cap strips having fine perforations, slots or other apertures, provide a filter deck assembly system having high capacity and high efficiency.

The deck assemblies 18 may be considered free floating and may be contained only by the cap strips 100. A replaceable cap strip 100 can be removed to free (e.g., replace) a deck assembly without damaging the deck assembly.

Each of the embodiments of the present inventive technology minimizes potential tolerance constraints on the circumferential stackup in the manufacture and assembly of the deck sections. The embodiments allow space for thermal expansion of both the filter plates and corrugated sheets. The deck assemblies of the embodiments can expand without breaking welds or bending parts.

While the inventive technology has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A rotary drum filter comprising:
   (a) a drum mounted for rotation,
   (b) a plurality of longitudinally extending division grids mounted and spaced in parallel relationship about the outer circumferential surface of the drum,
   (c) a plurality of corrugated sheets each sheet having alternating ridges and channels extending from a leading edge to a trailing edge, the leading and trailing edges of each sheet mounted on adjacent pairs of division grids to define filtrate compartments around the circumference of the drum,
   (d) drainage slots near the trailing edge of each channel for communication to said compartments,
   (e) a plurality of perforated filter plates, each filter plate attached to the top of a corresponding corrugated sheet,
   (f) a seal clip disposed at a leading edge of each corrugated sheet,
   (g) a seal member disposed close to the underside leading edge of each corrugated sheet and engaged between the seal clip and the corrugated sheet,
   (h) shoulder portions on both longitudinal faces of each division grid adapted to slidably and replaceably mount respective leading and trailing edges of circumferentially adjacent corrugated sheets, and
   wherein at least one of the seal clip and the seal member is partially disposed under the leading edge of the corrugated sheet.

2. The rotary drum filter according to claim 1, wherein the sealing member comprises Teflon, ethylene-propylene rubber, Viton, Gore-Tex and/or another compressible material.

3. The rotary drum filter according to claim 1, wherein the seal clip and corrugated sheet are made from a material comprising a common material, austenitic stainless steels or combinations thereof.

4. The rotary drum filter according to claim 1, wherein the seal clip is a J shape or an elongated J shape or a reverse L shape or an elongated reverse L shape that securely anchors the seal member.

5. The rotary drum filter according to claim 1, wherein each perforated filter plate has a leading edge that is set back from the leading edge of the corresponding corrugated sheet.

6. The rotary drum filter according to claim 5, wherein each perforated filter plate has a trailing edge that is set back from the trailing edge of said corrugated sheet.

7. The rotary drum filter according to claim 6 further comprising longitudinally extending cap strips that are removably fixed to the division grids so as to overlap the leading and trailing edges of the adjacent corrugated sheets.

8. The rotary drum filter according to claim 7, wherein the cap strips are perforated.

9. A filter deck assembly comprising:
   (a) a corrugated sheet having alternating ridges and channels extending from a leading edge to a trailing edge, and having drainage slots near the trailing edge of each channel,
   (b) a perforated filter plate attached to the top of the corrugated sheet,
   (c) a seal clip disposed at a leading edge of the corrugated sheet, and
   (d) a seal member disposed close to the underside leading edge of each corrugated sheet and engaged between the seal clip and the corrugated sheet, and
   wherein at least one of the seal clip and the seal member is partially disposed under the leading edge of the corrugated sheet.

10. The filter deck assembly according to claim 9, wherein the seal member comprises Teflon, ethylene-propylene rubber, Viton, Gore-Tex and/or another compressible material.

11. The filter deck assembly according to claim 9, wherein the seal clip and corrugated sheet are made from a material comprising a common material, austenitic stainless steels or combinations thereof.

12. The filter deck assembly according to claim 9, wherein each perforated filter plate has a leading edge that is set back from the leading edge of the corresponding corrugated sheet.

13. The filter deck assembly according to claim 12, wherein each perforated filter plate has a trailing edge that is set back from the trailing edge of said corrugated sheet.

14. The filter deck assembly according to claim 13 further comprising at least one longitudinally extending cap strip that can be removably fixed to a division grid in a rotary drum filter so as to overlap the leading and trailing edges of the adjacent corrugated sheets.

15. The filter deck assembly according to claim 14, wherein the cap strip is perforated.

16. A rotary drum filter comprising:
   (a) a drum mounted for rotation,
   (b) a plurality of longitudinally extending division grids mounted and spaced in parallel relationship about the outer circumferential surface of the drum,
   (c) a plurality of corrugated sheets each sheet having alternating ridges and channels extending from a leading edge to a trailing edge, the leading and trailing edges of each sheet mounted on adjacent pairs of division grids to define filtrate compartments around the circumference of the drum,
   (d) drainage slots near the trailing edge of each channel for communication to said compartments,
   (e) a plurality of perforated filter plates, each filter plate attached to the top of a corresponding corrugated sheet,
   (f) a seal clip disposed under and in front of a leading edge of each corrugated sheet,
   (g) a seal member disposed under and/or in front of the leading edge of the corrugated sheet and held in place by the seal clip, and
   (h) shoulder portions on both longitudinal faces of each division grid adapted to slidably and replaceably mount respective leading and trailing edges of circumferentially adjacent corrugated sheets.

17. The rotary drum filter according to claim 16, wherein the sealing member comprises Teflon, ethylene-propylene rubber, Viton, Gore-Tex and/or another compressible material.

18. The rotary drum filter according to claim 16, wherein the seal clip and corrugated sheet are made from a material comprising a common material, austenitic stainless steels or combinations thereof.

19. The rotary drum filter according to claim 16, wherein the seal clip is a J shape or an elongated J shape or a reverse L shape or an elongated reverse L shape that securely anchors the seal member.

20. The rotary drum filter according to claim 16, wherein each perforated filter plate has a leading edge that is set back from the leading edge of the corresponding corrugated sheet.

21. The rotary drum filter according to claim 20, wherein each perforated filter plate has a trailing edge that is set back from the trailing edge of said corrugated sheet.

22. The rotary drum filter according to claim 21 further comprising longitudinally extending cap strips that are removably fixed to the division grids so as to overlap the leading and trailing edges of the adjacent corrugated sheets.

23. The rotary drum filter according to claim 22, wherein the cap strips are perforated.

24. The rotary drum filter according to claim 16, wherein the seal member has a first piece and a second piece and wherein the first piece is under the leading edge of the corrugated sheet and the second piece is in front of the leading edge of the corrugated sheet.

25. A filter deck assembly comprising:
  (a) a corrugated sheet having alternating ridges and channels extending from a leading edge to a trailing edge, and having drainage slots near the trailing edge of each channel,
  (b) a perforated filter plate attached to the top of the corrugated sheet,
  (c) a seal clip disposed under and in front of a leading edge of each corrugated sheet, and
  (d) a seal member disposed under and/or in front of the leading edge of the corrugated sheet and held in place by the seal clip.

26. The filter deck assembly according to claim 25, wherein the seal member comprises Teflon, ethylene-propylene rubber, Viton, Gore-Tex and/or another compressible material.

27. The filter deck assembly according to claim 25, wherein the seal clip and corrugated sheet are made from a material comprising a common material, austenitic stainless steels or combinations thereof.

28. The filter deck assembly according to claim 25, wherein each perforated filter plate has a leading edge that is set back from the leading edge of the corresponding corrugated sheet.

29. The filter deck assembly according to claim 28, wherein each perforated filter plate has a trailing edge that is set back from the trailing edge of said corrugated sheet.

30. The filter deck assembly according to claim 29 further comprising at least one longitudinally extending cap strip that can be removably fixed to a division grid in a rotary drum filter so as to overlap the leading and trailing edges of the adjacent corrugated sheets.

31. The filter deck assembly according to claim 30, wherein the cap strip is perforated.

32. The filter deck assembly according to claim 25, wherein the seal member has a first piece and a second piece and wherein the first piece is under the leading edge of the corrugated sheet and the second piece is in front of the leading edge of the corrugated sheet.

33. A rotary drum filter comprising:
  (a) a drum mounted for rotation,
  (b) a plurality of longitudinally extending division grids mounted and spaced in parallel relationship about the outer circumferential surface of the drum,
  (c) a plurality of corrugated sheets each sheet having alternating ridges and channels extending from a leading edge to a trailing edge, the leading and trailing edges of each sheet mounted on adjacent pairs of division grids to define filtrate compartments around the circumference of the drum,
  (d) drainage slots near the trailing edge of each channel for communication to said compartments,
  (e) a plurality of perforated filter plates, each filter plate attached to the top of a corresponding corrugated sheet,
  (f) a seal clip disposed under and in front of a leading edge of each corrugated sheet,
  (g) a seal member disposed under and/or in front of the leading edge of the corrugated sheet and held in place by the seal clip,
  (h) shoulder portions on both longitudinal faces of each division grid adapted to slidably and replaceably mount respective leading and trailing edges of circumferentially adjacent corrugated sheets, and
  wherein the seal member has a first piece and a second piece, and wherein the first piece is under the leading edge of the corrugated sheet and the second piece is in front of the leading edge of the corrugated sheet.

34. The rotary drum filter according to claim 33, wherein the sealing member comprises Teflon, ethylene-propylene rubber, Viton, Gore-Tex and/or another compressible material.

35. The rotary drum filter according to claim 33, wherein the seal clip and corrugated sheet are made from a material comprising a common material, austenitic stainless steels or combinations thereof.

36. The rotary drum filter according to claim 33, wherein the seal clip is a J shape or an elongated J shape or a reverse L shape or an elongated reverse L shape that securely anchors the seal member.

37. The rotary drum filter according to claim 33, wherein each perforated filter plate has a leading edge that is set back from the leading edge of the corresponding corrugated sheet.

38. The rotary drum filter according to claim 37, wherein each perforated filter plate has a trailing edge that is set back from the trailing edge of said corrugated sheet.

39. The rotary drum filter according to claim 38 further comprising longitudinally extending cap strips that are removably fixed to the division grids so as to overlap the leading and trailing edges of the adjacent corrugated sheets.

40. The rotary drum filter according to claim 39, wherein the cap strips are perforated.

41. A filter deck assembly comprising:
  (a) a corrugated sheet having alternating ridges and channels extending from a leading edge to a trailing edge, and having drainage slots near the trailing edge of each channel,
  (b) a perforated filter plate attached to the top of the corrugated sheet,
  (c) a seal clip disposed under and in front of a leading edge of each corrugated sheet,
  (d) a seal member disposed under and/or in front of the leading edge of the corrugated sheet and held in place by the seal clip, and
  wherein the seal member has a first piece and a second piece and wherein the first piece is under the leading edge of the corrugated sheet and the second piece is in front of the leading edge of the corrugated sheet.

42. The filter deck assembly according to claim 41, wherein the seal member comprises Teflon, ethylene-propylene rubber, Viton, Gore-Tex and/or another compressible material.

43. The filter deck assembly according to claim 41, wherein the seal clip and corrugated sheet are made from a material comprising a common material, austenitic stainless steels or combinations thereof.

44. The filter deck assembly according to claim 41, wherein each perforated filter plate has a leading edge that is set back from the leading edge of the corresponding corrugated sheet.

45. The filter deck assembly according to claim 44, wherein each perforated filter plate has a trailing edge that is set back from the trailing edge of said corrugated sheet.

46. The filter deck assembly according to claim 45 further comprising at least one longitudinally extending cap strip that can be removably fixed to a division grid in a rotary drum filter so as to overlap the leading and trailing edges of the adjacent corrugated sheets.

47. The filter deck assembly according to claim 46, wherein the cap strip is perforated.

* * * * *